US012755965B2

(12) United States Patent
Harata et al.

(10) Patent No.: US 12,755,965 B2
(45) **Date of Patent: *Oct. 6, 2026**

(54) METHOD FOR MANUFACTURING NEGATIVE ELECTRODE ACTIVE MATERIAL

(71) Applicant: TOYOTA JIDOSHA KABUSHIKI KAISHA, Toyota (JP)

(72) Inventors: Masanori Harata, Kariya (JP); Kazuhiro Niimura, Kariya (JP); Kota Urabe, Kariya (JP); Yasuhiro Yamaguchi, Kariya (JP); Tatsuya Eguchi, Kariya (JP); Mitsutoshi Otaki, Susono (JP); Jun Yoshida, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 955 days.

This patent is subject to a terminal disclaimer.

(21) Appl. No.: 17/945,381

(22) Filed: Sep. 15, 2022

(65) Prior Publication Data

US 2023/0086351 A1 Mar. 23, 2023

(30) Foreign Application Priority Data

Sep. 17, 2021 (JP) ................................ 2021-151711

(51) Int. Cl.
*H01M 4/38* (2006.01)
*C01B 33/021* (2006.01)
*H01M 4/02* (2006.01)

(52) U.S. Cl.
CPC ........... *H01M 4/386* (2013.01); *C01B 33/021* (2013.01); *H01M 4/381* (2013.01); *C01P 2002/72* (2013.01); *C01P 2004/62* (2013.01); *C01P 2006/12* (2013.01); *C01P 2006/40* (2013.01); *H01M 2004/021* (2013.01); *H01M 2004/027* (2013.01)

(58) Field of Classification Search
None
See application file for complete search history.

(56) References Cited

U.S. PATENT DOCUMENTS 6,402,774 B1 6/2002 Caldironi
11,088,367 B2 8/2021 Kosaka et al.
11,600,817 B2 3/2023 Harata et al.
11,799,076 B2 10/2023 Otaki et al.
2008/0253955 A1 10/2008 Leblanc et al.
2012/0021283 A1 1/2012 Chan et al.
2014/0308585 A1* 10/2014 Han ........................ C01B 33/18 252/502
2015/0376016 A1* 12/2015 Krishna ................ C01B 33/021 252/62.3 T
2015/0380724 A1 12/2015 Chan
2018/0323631 A1 11/2018 Otaki et al.
2020/0020929 A1 1/2020 Yoshida et al.
2020/0176768 A1 6/2020 Kosaka et al.
2021/0020938 A1 1/2021 Yamaguchi et al.
2021/0066713 A1 3/2021 Harata
2021/0066714 A1* 3/2021 Harata .................. C01B 33/037
2021/0305556 A1 9/2021 Otaki et al.
2021/0384498 A1 12/2021 Suzuki et al.
2021/0391576 A1 12/2021 Otaki et al.
2022/0393159 A1 12/2022 Abe
2023/0090390 A1* 3/2023 Otaki .................. H01M 4/0433 429/229
2023/0253557 A1 8/2023 Suzuki et al.
2024/0021805 A1* 1/2024 Otaki .................. H01M 4/0409
2024/0030421 A1* 1/2024 Mashimo .............. H01M 4/134
2024/0030422 A1* 1/2024 Mashimo ................ H01M 4/36

FOREIGN PATENT DOCUMENTS

CN 104105239 A 10/2014
CN 105529451 A * 4/2016 .......... H01M 4/1395
CN 112447972 A 11/2023
JP 2006-041134 A 2/2006
JP 2012-140266 A 7/2012
JP 2012-224488 A 11/2012
JP 2013-018679 A 1/2013
JP 2017-059534 A 3/2017
JP 2020-017513 A 1/2020
JP 2021-018981 A 2/2021
JP 3075306 U 2/2021
JP 2021-031349 A 3/2021
JP 2021-158003 A 10/2021
JP 2021-158004 A 10/2021
JP 2022-034998 A 3/2022

(Continued)

OTHER PUBLICATIONS

CN-105529451-A English Machine translation (Year: 2016).*
Ammar et al., On the clathrate form of elemental silicon, Si136: preparation and charaterisation of NaxSi136 (x→0), May 2004, Solid State Sciences, vol. 6, Issue 5, pp. 393-400 (Year: 2004).*
Andrew Dopilka et al., "Structural Origin of Reversible Li Insertion in Guest-Free, Type-II Silicon Clathrates" Advanced Energy & Sustainability Research, DOI: 10.1002/aesr.202000114, pp. 1-15, Published by Wiley-VCH GmbH, 2021.
Andrew Dopilka et al., Supporting Information: "Structural Origin of Reversible Li Insertion in Guest-Free, Type-II Silicon Clathrates", pp. S1-S15, 2021.
Non-Final Office Action dated Jul. 14, 2023, Issued to U.S. Appl. No. 17/729,725, filed Apr. 26, 2022.

(Continued)

*Primary Examiner* — Ula C Ruddock
*Assistant Examiner* — Maria F Orozco
(74) *Attorney, Agent, or Firm* — Dinsmore & Shohl LLP

(57) ABSTRACT

A method for manufacturing a negative electrode active material includes: an alloying step of causing an Na source and an Si source to react to produce an Na—Si alloy containing Na and Si; and a silicon clathrate production step of heating the Na—Si alloy and reducing an amount of Na in the Na—Si alloy to produce a type-II silicon clathrate. Porous Si with a BET specific surface area of 20 $m^2/g$ or more is used as the Si source.

6 Claims, 4 Drawing Sheets

(56) References Cited

FOREIGN PATENT DOCUMENTS

| | | | |
|---|---|---|---|
| JP | 2023-044620 | A | 3/2023 |
| KR | 10-2009-0053807 | A | 5/2009 |
| WO | 2008/031229 | A1 | 3/2008 |

OTHER PUBLICATIONS

U.S. Appl. No. 17/729,725, filed Apr. 26, 2022.
H. Horie et al., "Controlled Thermal Decomposition of NaSi to Derive Silicon Clathrate Compounds", Journal of Solid State Chemistry, 182, pp. 129-135, 2009.
Notice of Allowance dated Jan. 24, 2024, Issued to U.S. Appl. No. 17/729,725, filed Apr. 26, 2022.
Masafumi Arakawa, "Introduction to Particle Size Measurement," The Society of Powder Technology, Jun. 10, 1980, vol. 17, No. 6 , pp. 299-307, Japan (English translation of Abstract attached).
Non-Final Office Action dated Aug. 20, 2025, issued to U.S. Appl. No. 17/939,412 (15 pages).
Langer et al., "Electrochemical Lithiation of Silicon Clathrate-II," Journal of The Electrochemical Society, Jul. 20, 2012, vol. 159 (8), A1318-A1322 (6 pages).

* cited by examiner

METHOD FOR MANUFACTURING NEGATIVE ELECTRODE ACTIVE MATERIAL

CROSS-REFERENCE TO RELATED APPLICATION

This application claims priority to Japanese Patent Application No. 2021-151711 filed on Sep. 17, 2021, incorporated herein by reference in its entirety.

BACKGROUND

1. Technical Field

The present disclosure relates to methods for manufacturing a negative electrode active material.

2. Description of Related Art

A compound called a silicon clathrate in which another metal is enclosed in polyhedral spaces formed by silicon (Si) is known in the art. Among silicon clathrates, researches on type-I silicon clathrates and type-II silicon clathrate have mainly been reported.

A type-I silicon clathrate is represented by a composition formula of $Na_8Si_{46}$ in which dodecahedra each having one sodium (Na) atom enclosed by 20 Si atoms and tetradecahedra each having one Na atom enclosed by 24 Si atoms have common faces. Na is present in all of the polyhedral cages of the type-I silicon clathrate.

A type-II silicon clathrate is represented by a composition formula of $Na_xSi_{136}$ in which Si dodecahedra and Si hexadecahedra have common faces, where x satisfies $0 \leq x \leq 24$. That is, Na may be or may not be present in the polyhedral cages of the type-II silicon clathrate.

H. Horie, T. Kikudome, K. Teramura, and S. Yamanaka, Journal of Solid State Chemistry, 182, 2009, pp. 129-135 describes a method for manufacturing type-I and type-II silicon clathrates from an Na—Si alloy containing Na and Si. Specifically, this document describes that type-I and type-II silicon clathrates were manufactured by heating the Na—Si alloy to 400° C. or higher under a reduced pressure condition of less than $10^{-4}$ Torr (that is, less than $1.3\times10^{-2}$ Pa) and removing Na as vapor from the Na—Si alloy. This document also describes that the rate of production of type-I and type-II silicon clathrates varies due to the difference in heating temperature, and that high heating temperatures cause removal of Na from a type-I silicon clathrate and thus changes the structure of the type-I silicon clathrate, so that Si crystals with a typical diamond structure are formed.

This document also describes that $Na_{22.56}Si_{136}$, $Na_{17.12}Si_{136}$, $Na_{18.72}Si_{136}$, $Na_{7.20}Si_{136}$, $Na_{11.04}Si_{136}$, $Na_{1.52}Si_{136}$, $Na_{23.36}Si_{136}$, $Na_{24.00}Si_{136}$, $Na_{20.48}Si_{136}$, $Na_{16.00}Si_{136}$, and $Na_{14.80}Si_{136}$ were manufactured as type-II silicon clathrates.

Japanese Unexamined Patent Application Publication No. 2012-224488 (JP 2012-224488 A) also describes a method for manufacturing a silicon clathrate. Specifically, JP 2012-224488 A describes that type-I and type-II silicon clathrates were manufactured by heating an Na—Si alloy produced by using a silicon wafer and Na at 400° C. for three hours under a reduced pressure condition of $10^{-2}$ Pa or less and removing Na from the Na—Si alloy.

JP 2012-224488 A also reports a type-II silicon clathrate with lithium (Li), potassium (K), rubidium (Rb), cesium (Cs), or barium (Ba) substituted for Na enclosed in the type-II silicon clathrate, and a type-II silicon clathrate with gallium (Ga) or germanium (Ge) partially substituted for Si in the type-II silicon clathrate.

SUMMARY

Type-II silicon clathrates maintain their structure even when Na contained therein is removed. The inventors focused on this point and arrived at the idea of using a type-II silicon clathrate from which Na contained therein has been removed as a negative electrode active material for a lithium-ion secondary battery.

In order to manufacture a type-II silicon clathrate with a low Na content, it is necessary to remove Na at a high temperature. Therefore, coarse pores, namely cavities, tend to be formed in a negative electrode active material containing this type-II silicon clathrate. Coarse pores are more easily crushed than fine pores in a pressing process that is performed during production of electrodes. It is therefore considered that a negative electrode active material with cavities formed therein has a reduced overall pore volume that can contribute to a battery reaction.

It is known that a negative electrode active material containing silicon greatly expands and contracts during charging and discharging of a lithium-ion secondary battery. If a negative electrode active material containing silicon expands and contracts excessively during charging and discharging of a lithium-ion secondary battery, the negative electrode active material may not be able to withstand repeated charging and discharging and may be damaged. In order to reduce excessive expansion and contraction of a negative electrode active material, it is considered effective to form many fine pores in the negative electrode active material to increase the overall pore volume of the negative electrode active material and make the structure of the negative electrode active material dense.

However, since the negative electrode active material obtained by the above conventional method for manufacturing a type-II silicon clathrate is a negative electrode active material having cavities and a small pore volume, it is hard to say that this negative electrode active material is suitable for lithium-ion secondary batteries.

The present disclosure was made in view of such circumstances, and it is an object of the present disclosure to provide a negative electrode active material containing a type-II silicon clathrate and having a sufficient pore volume.

A method for manufacturing a negative electrode active material according to the present disclosure that solves the above problem is a method for manufacturing a negative electrode active material including: an alloying step of causing an Na source and an Si source to react to produce an Na—Si alloy containing Na and Si; and a silicon clathrate production step of heating the Na—Si alloy and reducing an amount of Na in the Na—Si alloy to produce a type-II silicon clathrate. Porous Si with a Brunauer, Emmett and Teller (BET) specific surface area of 20 $m^2/g$ or more is used as the Si source. A negative electrode active material according to the present disclosure that solves the above problem is a negative electrode active material containing a type-II silicon clathrate and having a BET specific surface area of 20 $m^2/g$ or more and an average particle size $D_{50}$ of 0.5 μm or more.

According to the method for manufacturing a negative electrode active material of the present disclosure, it is possible to obtain a negative electrode active material containing a type-II silicon clathrate and having a sufficient pore volume. The negative electrode active material of the present disclosure contains a type-II silicon clathrate and has a sufficient pore volume.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
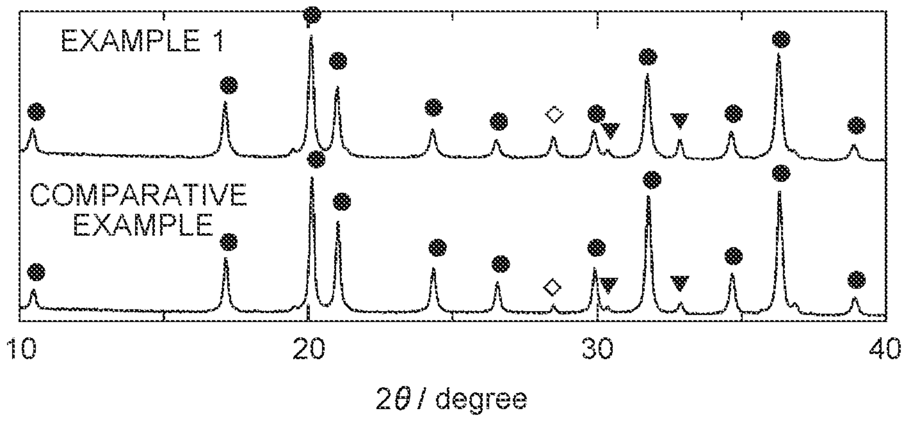
FIG. 1 is an overlay X-ray diffraction chart of negative electrode active materials of Example 1 and a comparative example.

The best mode for carrying out the present disclosure will be described below. A numerical range of "L to U" described in the present specification is inclusive of the lower limit L and the upper limit U unless otherwise specified. A numerical range can be defined by combining these upper and lower limit values and numerical values mentioned in examples as desired. Numerical values selected as desired from a numerical range can used as the numerical values of the upper and lower limits.

A method for manufacturing a negative electrode active material according to the present disclosure includes: an alloying step of causing an Na source and an Si source to react to produce an Na—Si alloy containing Na and Si; and a silicon clathrate production step of heating the Na—Si alloy and reducing an amount of Na in the Na—Si alloy to produce a type-II silicon clathrate. Porous Si with a BET specific surface area of 20 $m^2/g$ or more is used as the Si source. A negative electrode active material according to the present disclosure contains a type-II silicon clathrate and has a BET specific surface area of 20 $m^2/g$ or more and an average particle size $D_{50}$ of 0.5 μm or more.

Hereinafter, the method for manufacturing a negative electrode active material according to the present disclosure is sometimes simply referred to as the manufacturing method of the present disclosure. Negative electrode active materials obtained by the manufacturing method of the present disclosure are generally referred to as silicon clathrate negative electrode active materials. Of the silicon clathrate negative electrode active materials, a silicon clathrate negative electrode active material whose BET specific surface area and average particle size $D_{50}$ are each within the above range is sometimes referred to as the negative electrode active material of the present disclosure in order to distinguish such a silicon clathrate negative electrode active material from other silicon clathrate negative electrode active materials.

One element of the technical significance of the manufacturing method of the present disclosure is to use porous Si with a BET specific surface area of 20 $m^2/g$ or more as an Si source that is a raw material of an Na—Si alloy to cause a silicon clathrate negative electrode active material that is a product of the porous Si to have a sufficient pore volume. As will be described in detail later in the section of Examples, a silicon clathrate negative electrode active material with a sufficiently large pore volume can actually be obtained by using porous Si with a BET specific surface area of 20 $m^2/g$ as an Si source.

Since the negative electrode active material of the present disclosure has a BET specific surface area of 20 $m^2/g$ or more and an average particle size $D_{50}$ of 0.5 μm or more, it can be said that the negative electrode active material of the present disclosure has a sufficiently large pore volume. Hereinafter, the manufacturing method of the present disclosure will be described step by step.

In the alloying step of the manufacturing method of the present disclosure, the Na source and the Si are caused to react to produce an Na—Si alloy. The Si source used in the alloying step is porous Si with a BET specific surface area of 20 $m^2/g$ or more.

The Na—Si alloy used in the manufacturing method of the present disclosure is an Na—Si alloy whose composition of Na and Si is represented by $Na_ySi_{136}$ ($24<y$). In some embodiments, an alloy is used in which Na is present in excess with respect to Si, that is, an alloy whose composition of Na and Si is represented by $Na_ySi$ ($1<z$), as the Na—Si alloy. That is, the Na—Si alloy refers to an alloy composed of an NaSi phase and a metallic Na phase. The Na—Si alloy refers to an alloy containing a larger amount of Na than the above type-I silicon clathrate (composition formula of $Na_8Si_{46}$) and type-II silicon clathrate (composition formula of $Na_xSi_{136}$ ($0\leq x\leq 24$)).

Although the method for producing an Na—Si alloy by the alloying step is not particularly limited, the alloying can be performed by, for example, a solid phase method in which Na and Si are heated in an inert gas atmosphere while maintaining their solid state.

Other elements other than Na and Si may be present in the Na—Si alloy as long as it does not depart from the spirit and scope of the present disclosure. Examples of such other elements include Li, K, Rb, Cs, and Ba that are substitutable for Na in a type-II silicon clathrate, and Ga and Ge that are substitutable for Si in a type-II silicon clathrate.

The porous Si used as an Si source in the manufacturing method of the present disclosure may be any porous Si having a BET specific surface area of 20 $m^2/g$ or more. Although the porous Si may be a commercially available product, the step of manufacturing porous Si may be included as one step of the manufacturing method of the present disclosure.

An example of the method for producing porous Si is to produce porous Si by producing an alloy of magnesium (Mg) and Si and removing Mg from the alloy. Specifically, in this case, porous Si is produced by the following reactions.

$$2Mg+Si\rightarrow Mg_2Si$$

$$Mg_2Si+O_2\rightarrow 2MgO+Si$$

Another example of the method for producing porous Si is to produce porous Si by producing an alloy of Li and Si and removing Li from the alloy. In this case, porous Si is produced by the following reactions.

$$4Li+Si \rightarrow Li_4Si$$

$$Li_4Si+4C_2H_5OH \rightarrow 4CH_3CH_2OLi+Si+2H_2$$

The method for producing porous Si is not limited to these methods, and a suitable method can be selected as appropriate from various known methods.

Although the porous Si may be any porous Si having a BET specific surface area of 20 $m^2/g$ or more, the BET specific surface area of the porous Si is in the ranges of 25 $m^2/g$ or more and 30 $m^2/g$ or more. Although the ranges of the BET specific surface area of the porous Si have no upper limit, the upper limit is practically 200 $m^2/g$ or less.

The magnitude of the pore volume of porous Si can also be expressed by an index other than the BET specific surface area. For example, porous Si not only having a BET specific surface area within the above range but also have an average particle diameter $D_{50}$ of 0.5 μm or more, 1.0 μm or more, or 1.8 μm or more may be selected as the porous Si used in the manufacturing method of the present disclosure. It is more obvious that porous Si having a BET specific surface area within the above range and an average particle size within this range has a large pore volume rather than just having a small particle size. Although the average particle size $D_{50}$ of the porous Si has no specific upper limit, the upper limit is practically 3.0 μm or less. In the present specification, the "average particle size" means $D_{50}$ when a sample is measured by a common laser diffraction particle size analyzer.

Porous Si whose cumulative pore volume of 100 nm or less is 0.1 $cm^3/g$ or more, 0.15 $cm^3/g$ or more, or 0.30 $cm^3/g$ or more may be selected as the porous Si used in the manufacturing method of the present disclosure. Although the cumulative pore volume of the porous Si has no specific upper limit, the upper limit is practically 0.8 $cm^3/g$ or less. The porous Si may be porous Si that satisfies the above range of the cumulative pore volume in addition to the above range of the BET specific surface area and the above range of the average particle size, or may be porous Si that satisfies only the above range of the cumulative pore volume. A value measured by a gas adsorption method can be used as the cumulative pore volume of the porous Si.

The Na source need only be a substance that introduces a small amount of impurities into the Na—Si alloy. A specific example of the Na source is a metallic Na dispersion of particles of metallic Na, NaH, or metallic Na dispersed in oil.

In some embodiments, the alloying step need only be performed under the condition that the Na—Si alloy is produced from the above Na source and Si source, and is performed under the condition that the Na source and the Si source react to produce the Na—Si alloy. In some embodiments of the manufacturing method of the present disclosure, however, the alloying step is performed at a temperature below the melting point of NaSi, considering the fact that porous Si is used as an Si source in order to cause the silicon clathrate negative electrode active material that is a final product to have a sufficient pore volume. Specifically, the heating temperature in the alloying step is 800° C. or less, 600° C. or less, 450° C. or less, less than 400° C., 380° C. or less, or 360° C. or less.

The heating temperature in the alloying step has no specific lower limit. However, as will be described later in the section of Examples, the heating temperature in the alloying step is 300° C. or more, 310° C. or more, 320° C. or more, or 340° C. or more in order to efficiently cause the reactions in the silicon clathrate production step. In some embodiments, the alloying step is performed in an inert atmosphere such as an argon (Ar) atmosphere.

The manufacturing method of the present disclosure includes the silicon clathrate production step of heating the Na—Si alloy obtained in the above alloying step and reducing the amount of Na in the Na—Si alloy to produce a type-II silicon clathrate. This silicon clathrate production step can also be performed by such methods in which an Na—Si alloy is heated under a reduced pressure condition as described in H. Horie, T. Kikudome, K. Teramura, and S. Yamanaka, Journal of Solid State Chemistry, 182, 2009, pp. 129-135, JP 2012-224488 A, etc. mentioned above.

According to the above conventional techniques, a highly reduced pressure condition (high vacuum) is required in the silicon clathrate production step. Since Na is discharged as vapor from the Na—Si alloy to the outside of the system, special measures need to be taken for the discharged Na. Moreover, it is necessary to remove Si with a diamond structure produced as a by-product by a method such as centrifugation, and an improvement in yield probably cannot be expected. Furthermore, when an expensive material such as Ga is required for manufacturing of a type-II silicon clathrate, it is difficult to manufacture a type-II silicon clathrate at low cost. Therefore, the processes described in H. Horie, T. Kikudome, K. Teramura, and S. Yamanaka, Journal of Solid State Chemistry, 182, 2009, pp. 129-135, JP 2012-224488 A, etc. are not always industrially efficient as a process of manufacturing a negative electrode active material.

The inventors studied silicon clathrate production steps that could efficiently produce a type-II silicon clathrate, and arrived at the idea of trapping Na vapor in the reaction system. Specifically, an Na getter agent that can react with Na, such as SiO, $MoO_3$, or FeO, is placed in the reaction system in a non-contact manner with the Na—Si alloy. Since Na vapor generated from the Na—Si alloy is trapped by the Na getter agent, the partial pressure of Na in the reaction system decreases, and a desired increase in reaction rate is thus expected. Moreover, this method would not require a highly reduced pressure condition. This method would also significantly reduce the amount of Na that is discharged to the outside of the system.

The inventors actually conducted experiments in an environment in which the Na—Si alloy and the Na getter agent coexisted in a non-contact manner. The inventors then found that the a desired reaction proceeded even in a slightly reduced pressure condition, that the amount of Na discharged to the outside of the system was able to be reduced, and that a type-II silicon clathrate was able to be manufactured.

When a larger reaction system is used in order to improve manufacturing efficiency in the silicon clathrate production step that is performed in the non-contact environment as described above, it is necessary to place the Na—Si alloy that is a part of a raw material in a bulky manner in the reaction system.

The inventors realized that, when a raw material was placed in a bulky manner in the reaction system in the silicon clathrate production step that was performed in the non-contact environment, Na vapor generated by heating was less likely to be discharged to the outside of the raw material and Na might not be sufficiently removed from the Na—Si alloy. In this case, removal of Na from the type-II silicon clathrate produced from the Na—Si alloy is also hindered, which makes it difficult to efficiently manufacture a negative electrode active material to be manufactured, that is, a type-II silicon clathrate from which Na contained therein has been removed.

The inventors further improved the silicon clathrate production step in the non-contact environment to seek a method for manufacturing the negative electrode active material more efficiently. The inventors then found that the productivity of the negative electrode active material could be improved by using an Na trapping agent that could react with the Na—Si alloy and directly receive Na from the Na—Si alloy, namely by causing the Na—Si alloy and the Na trapping agent to react in contact with each other.

That is, in the silicon clathrate production step using the Na trapping agent, Na derived from the Na—Si alloy and the Na trapping agent react with each other with the Na—Si alloy and the Na trapping agent in contact with each other, so that Na is removed from the Na—Si alloy. As described above, in the method for manufacturing a negative electrode active material according to the present disclosure, the Na trapping agent can directly receive Na from the Na—Si alloy, and therefore the reduced pressure for producing Na vapor is not required.

The Na trapping agent that receives Na from the Na—Si alloy is in contact with the Na—Si alloy. Therefore, even when a reaction raw material containing the Na trapping agent and the Na—Si alloy is bulky, the transfer of Na proceeds satisfactorily in the entire reaction raw material. Therefore, the method for manufacturing a negative electrode active material according to the present disclosure is suitable for large-scale manufacturing and industrialization of negative electrode active materials.

According to the silicon clathrate production step using the Na trapping agent, a type-II silicon clathrate can be manufactured as will be described later.

Hereinafter, the silicon clathrate production step using the Na trapping agent is sometimes referred to as the silicon clathrate production step by the solid phase method. This is because the Na—Si alloy and $CaCl_2$ are considered to react in a solid state according to this method.

In the silicon clathrate production step by the solid phase method, it is not necessary to generate Na vapor and to capture the Na vapor with an Na getter agent that is not in contact with the Na—Si alloy. Therefore, the reaction for removing Na from the Na—Si alloy to produce a negative electrode active material proceeds suitably even when the reaction raw material is bulky. According to the silicon clathrate production step by the solid phase method, it is therefore possible to produce a relatively large amount of negative electrode active material at a time by using a relatively large amount of reaction raw material. Based on the above, it can be said that, when the manufacturing method of the present disclosure includes the silicon clathrate production step by the solid phase method, a negative electrode active material suitable for energy storage devices such as secondary batteries can be efficiently manufactured.

The silicon clathrate production step by the solid phase method can be represented by the following reaction formula when $CaCl_2$ is used as an Na trapping agent. As will be described later, $CaCl_2$ is one of the Na trapping agents that are suitably used in the silicon clathrate production step by the solid phase method.

$$\text{Na—Si alloy}+CaCl_2 \rightarrow NaCl+Ca+\text{type-II silicon clathrate}$$

When $CaCl_2$ is used as an Na trapping agent as described above, Na is removed from the Na—Si alloy and a type-II silicon clathrate in which Na has been removed is produced. The Na trapping agent, $CaCl_2$, also reacts with Na in the Na—Si alloy to produce NaCl and Ca.

As used herein, the "Na trapping agent" means a substance that can react Na derived from the Na—Si alloy and receive Na from the Na—Si alloy. In other words, the Na trapping agent reacts with the Na—Si alloy.

By using a Na trapping agent that easily reacts with the Na—Si alloy, the heating temperature and reaction time in the silicon clathrate production step by the solid phase method can be reduced.

It can also be said that the Na trapping agent is a substance that oxidizes Na but does not oxidize Si. As used herein, the term "oxidation" means a reaction in which a target substance loses electrons.

The Na trapping agent is not limited to the substance that reacts with the Na—Si alloy and receives Na from the Na—Si alloy. The Na trapping agent may react with Na removed from the Na—Si alloy, specifically may react with Na vapor. In this case, the Na vapor generated in the Na—Si alloy is received by the Na trapping agent at a position very close to the Na—Si alloy. In this case as well, as in the silicon clathrate production step by the solid phase method, there are aspects that a manufacturing facility for reducing Na leakage is not required or can be simplified, and that a negative electrode active material can be efficiently manufactured even when the raw material in the reaction system is bulky.

In the present specification, the case where "Na—Si alloy and Na trapping agent react" and the case where "Na removed from Na—Si alloy and Na trapping agent react" are generally referred to as "Na derived from Na—Si alloy and Na trapping agent react."

The Na trapping agent is not particularly limited as long as it can receive Na derived from the Na—Si alloy. However, in some embodiments, an Na trapping agent that directly reacts with the Na—Si alloy and receives Na from the Na—Si alloy is used. This is because, when such an Na trapping agent is used, it is not necessary to generate Na vapor and thus it is not necessary to reduce Na vapor leakage, and therefore no special manufacturing facility is required.

In some embodiments, a metal oxide or a metal halide as such an Na trapping agent is used. In some embodiments, the metal of the metal oxide and metal halide is a metal that does not form an alloy with Si at a heating temperature in the silicon clathrate production step, such as 450° C. or less. The metal of the metal oxide and metal halide is suitably a metal that can be easily removed by dissolution in, for example, water or an aqueous solution of an acid that will be described later. Examples of the metal of the Na trapping agent include metals other than alkali metals.

Specific examples of the Na trapping agent include $CaCl_2$, $AlF_3$, $CaBr_2$, $CaI_2$, $Fe_3O_4$, FeO, $MgCl_2$, ZnO, $ZnCl_2$, and $MnCl_2$.

Of these substances, $CaCl_2$, $AlF_3$, $CaBr_2$, $CaI_2$, $Fe_3O_4$, FeO, ZnO, and $ZnCl_2$ are particularly suitable as Na trapping agents because they contain a metal that is less likely to form an alloy with Si.

The amount of the Na trapping agent may be appropriately determined according to the amount of Na contained in the Na—Si alloy. Only one Na trapping agent may be used, or a combination of a plurality of Na trapping agents may be used.

When $Fe_3O_4$ or FeO is used as an Na trapping agent, the heat of reaction between the Na—Si alloy and the Na trapping agent is considered to be large. In some embodiments, an Na—Si alloy and Na trapping agent that have a relatively large particle size is used, and specifically, it is suitable to use an Na—Si alloy and Na trapping agent that have an average particle size of 50 μm or more.

A suitable Na trapping agent is, for example, a substance in which a change in Gibbs energy (G) during the reaction with the Na—Si alloy is less than 0, that is, $\Delta G<0$. When $\Delta G<0$, it can be said that a spontaneous reaction between the Na—Si alloy and the Na trapping agent proceeds and that the reaction in which the Na trapping agent receives Na from the Na—Si alloy proceeds suitably even when the reaction system is not in a reduced pressure atmosphere. The smaller the value of ΔG, the more effective it is in reducing the content of type-I silicon clathrate and increasing the content of type-II silicon clathrate in a negative electrode active material.

Examples of the Na trapping agent in which $\Delta G<0$ during the reaction with the Na—Si alloy include $CaCl_2$, $AlF_3$, ZnO, $CaBr_2$, and $CaI_2$.

In order to restrain the reaction system from becoming hot during the reaction between the Na—Si alloy and the Na trapping agent, it is suitable to use an Na trapping agent in which an change in enthalpy during the reaction with the Na—Si alloy, that is, reaction enthalpy, is small. Specifically, in some embodiments, the Na trapping agent is a substance in which an enthalpy change ΔH during the reaction with 1 mol of Na—Si alloy is −80 kJ or more.

Examples of the Na trapping agent in which an enthalpy change ΔH during the reaction with 1 mol of Na—Si alloy is −80 kJ or more include $CaCl_2$, $AlF_3$, ZnO, $CaBr_2$, and $CaI_2$.

For reference, ΔG and ΔH in the present specification were calculated as follows.

When the Na trapping agent is a metal oxide or a metal halide, the Na trapping agent is represented by MX (where M is a metal, and X is oxygen or a halogen). When X is a halogen, the reaction between the MX and the Na—Si alloy can be represented by the following reaction formula.

$$\text{Na—Si alloy}+0.5MX_2\rightarrow NaX+0.5M+\text{type-II silicon clathrate}$$

When X is oxygen, the reaction between the MX and the Na—Si alloy can be represented by the following reaction formula.

$$\text{Na—Si alloy}+0.5MX\rightarrow 0.5Na_2X+0.5M+\text{type-II silicon clathrate}$$

The values of ΔG and ΔH per mole of the Na—Si alloy were calculated for various Na trapping agents on the assumption that the above reaction occurs at 300° C. Changes in ΔG and ΔH during various reactions are less than 5 kJ/mol at a temperature between 300° C. and 400° C. Namely, ΔG and ΔH do not change so much during various reactions when a temperature is between 300° C. and 400° C.

Since ΔG and ΔH of type-II silicon clathrates were not found in the database, the values of ΔG and ΔH of crystalline Si were used instead. Regarding substances other than the type-II silicon clathrates, the values of ΔG and ΔH in the database were used.

Thermodynamic calculation software, FactSage (Research Center of Computational Mechanics, Inc.), was used as the database. As a result, when the Na trapping agent was $CaCl_2$, ΔG of $CaCl_2$ per mole of the Na—Si alloy was −10.7573 kJ, and ΔH of $CaCl_2$ per mole of the Na—Si alloy was −13.4403 kJ.

When the Na trapping agent was $AlF_3$, ΔG of $AlF_3$ per mole of the Na—Si alloy was −63.5481 kJ, and ΔH of $AlF_3$ per mole of the Na—Si alloy was −75.0754 kJ.

When the Na trapping agent was ZnO, ΔG of ZnO per mole of the Na—Si alloy was −23.6394 kJ, and ΔH of ZnO per mole of the Na—Si alloy was −36.5823 kJ.

When the Na trapping agent was $CaBr_2$, ΔG of $CaBr_2$ per mole of the Na—Si alloy was −26.2789 kJ, and ΔH of $CaBr_2$ per mole of the Na—Si alloy was −20.1409 kJ.

When the Na trapping agent was $CaI_2$, ΔG of $CaI_2$ per mole of the Na—Si alloy was −29.8145 kJ, and ΔH of $CaI_2$ per mole of the Na—Si alloy was −19.9134 kJ.

It can be said that all of these Na trapping agents are useful as an Na trapping agent that is used in the manufacturing method of the present disclosure.

In the silicon clathrate production step by the solid phase method, the temperature at which the reaction raw material containing the Na—Si alloy and the Na trapping agent is heated (heating temperature t) is not particularly limited as long as it is a temperature at which the reaction between Na derived from the Na—Si alloy and the Na trapping agent proceeds. Examples of the heating temperature t include 100° C.≤t≤500° C., 200° C.≤t≤400° C., 270° C.≤t≤360° C., 270° C.≤t≤310° C., and 270° C.≤t≤300° C. A low heating temperature t is effective in reducing the content of type-I silicon clathrate and increasing the content of type-II silicon clathrate in a negative electrode active material. It is presumed that a stable type-I silicon clathrate is easily produced at a high heating temperature t.

A high heating temperature t is also useful in that it can reduce the reaction time.

In the silicon clathrate production step by the solid phase method, the heating temperature t is 400° C. or less in some embodiments. This is because the heating temperature t of 400° C. or less can reduce formation of Si crystals with a diamond structure and can give physical properties suitable as negative electrode active materials of non-aqueous electrolyte secondary batteries such as lithium-ion secondary batteries to the negative electrode active material of the present disclosure.

In the silicon clathrate production step by the solid phase method, a negative electrode active material containing a type-II silicon clathrate may be manufactured by performing the step of causing Na derived from the Na—Si alloy and the Na trapping agent to react to reduce the amount of Na in the Na—Si alloy as a single step.

The amount of Na remaining in the type-II silicon clathrate of the negative electrode active material may further be reduced by the following method: the negative electrode active material containing the type-II silicon clathrate is reheated in contact with a new Na trapping agent so that Na remaining in the type-II silicon clathrate of the negative electrode active material is transferred to the Na trapping agent. When the silicon clathrate production step by the solid phase method is performed in two steps as described above, washing may be performed twice, once after completion of the first step, and once after completion of the second step, or may be performed only once after completion of the second step.

The silicon clathrate negative electrode active material obtained by the manufacturing method of the present disclosure can be used as a negative electrode active material for secondary batteries such as lithium-ion secondary batteries and for energy storage devices such as electric double layer capacitors and lithium-ion capacitors. A lithium-ion secondary battery includes a positive electrode, a negative electrode, an electrolyte, and a separator, or includes a positive electrode, a negative electrode, and a solid electrolyte.

In the silicon clathrate negative electrode active material, the type-II silicon clathrate has a low Na content in some embodiments. This is because charge carriers such as lithium can enter the polyhedral cages of the type-II silicon clathrate from which Na has been removed, and as a result, the degree of expansion of the negative electrode active material is reduced.

In some embodiments, in the silicon clathrate negative electrode active material, the range of x in the composition formula, $Na_xSi_{136}$, of the type-II silicon clathrate is $0 \leq x \leq 10$, $0 \leq x \leq 7$, $0 \leq x \leq 5$, $0 \leq x \leq 3$, $0 \leq x \leq 2$, or $0 \leq x \leq 1$.

The silicon clathrate negative electrode active material can be used not only as a negative electrode active material but also for applications such as a thermoelectric element, a light-emitting element, and a light-absorbing element as described in JP 2012-224488 A.

In the silicon clathrate production step, by-products other than the type-II silicon clathrate may be produced. For example, as described above, when $CaCl_2$ is used as an Na trapping agent, NaCl and Ca are produced as by-products in addition to the type-II silicon clathrate. When a metal oxide such as $Fe_3O_4$ is used as an Na trapping agent, $Na_2O$, NaOH, and a complex oxide containing Na may be produced as by-products. In addition, free Na may remain in the reaction system. Since these by-products adhere to the silicon clathrate negative electrode active material obtained in the silicon clathrate production step, the manufacturing method of the present disclosure include the washing step of performing washing after the silicon clathrate production step to remove these by-products from the silicon clathrate negative electrode active material. In some embodiments, a solvent is used that can dissolve the by-products for washing. Specifically, it is desirable to perform the washing using an acidic aqueous solution.

In some embodiments, when an aluminum (Al) trapping agent contains fluorine (F), an F trapping agent such as $AlCl_3$ is added to the washing solvent particularly when the by-products include $Na_3AlF_6$. Specifically, when $AlCl_3$ is used as an F trapping agent, about 10 parts by mass of $AlCl_3/6H_2O$ to 100 parts by mass of the washing solvent is added in some embodiments.

In some embodiments, an acidic aqueous solution is used as a solvent for the washing step because silicon clathrates is easily corroded in a basic aqueous solution. In some embodiments, the concentration of the acid in the acidic aqueous solution is such a concentration that can efficiently dissolve the by-products.

In some embodiments, water from the silicon clathrate negative electrode active material is removed by filtration and drying after the washing step.

In some embodiments, the silicon clathrate negative electrode active material obtained by the manufacturing method of the present disclosure is the negative electrode active material of the present disclosure having a BET specific surface area of 20 $m^2/g$ or more and an average particle size $D_{50}$ of 0.5 μm or more.

A suitable range of the BET specific surface area of the negative electrode active material of the present disclosure is, for example, 25 $m^2/g$ or more, 30 $m^2/g$ or more, or 35 $m^2/g$ or more. Although the BET specific surface area of the negative electrode active material of the present disclosure has no specific upper limit, the BET specific surface area is practically 200 $m^2/g$ or less like the BET specific surface area of porous Si.

A suitable range of the average particle size $D_{50}$ of the negative electrode active material of the present disclosure is, for example, 0.5 μm or more, 0.7 μm or more, or 1.0 m or more. Although the average particle size $D_{50}$ of the negative electrode active material of the present disclosure has no specific upper limit, the average particle size $D_{50}$ is practically 8.0 μm or less like the average particle size $D_{50}$ of porous Si.

The negative electrode active material of the present disclosure suitably have a cumulative pore volume of 100 nm or less of, 0.05 $cm^3/g$ or more, 0.075 $cm^3/g$ or more, or 0.1 $cm^3/g$ or more. Although the cumulative pore volume of the negative electrode active material has no specific upper limit, the upper limit is practically 0.4 $cm^3/g$ or less.

In some embodiments, the silicon clathrate negative electrode active material may be pulverized and classified into powder with a constant particle size distribution.

Although the embodiment of the present disclosure is described above, the present disclosure is not limited to the above embodiment. The present disclosure can be carried out in various modified or improved forms that can be made by those skilled in the art without departing from the spirit and scope of the present disclosure.

Hereinafter, the present disclosure will be more specifically described using examples and a comparative example. The present disclosure is not limited by these examples.

Example 1

Porous Si Manufacturing Step

Mg powder and Si powder were weighed to a molar ratio of 2.02:1, mixed in a mortar, and heated in an Ar atmosphere at 580° C. for 12 hours in a heating furnace to cause the MG powder and the Si powder to react. The resultant mixture was cooled to room temperature to obtain $Mg_2Si$ in the form of an ingot. The $Mg_2Si$ was pulverized at 300 rpm for three hours by a ball mill using zirconia balls of 3 mm in diameter. The pulverized $Mg_2Si$ was heated under a flow of a mixed gas of Ar and $O_2$ with a volume ratio of 95:5 at 580° C. for 12 hours in a heating furnace to cause oxygen in the mixed gas and $Mg_2Si$ to react. The product of this reaction contains Si and MgO.

This reaction product was washed with a mixed solvent of $H_2O$, HCl, and HF with a volume ratio of 47.5:47.5:5. An oxide film on the Si surface and MgO in the reaction product were thus removed. The washed reaction product was filtered, and the obtained solid content was dried at 120° C. for three hours or more to obtain powdered porous Si. Hereinafter, this porous Si is sometimes referred to as the porous Si of Example 1 as needed. Similarly, porous Si obtained in the porous Si manufacturing step in each of the following examples is sometimes referred to as the porous Si of that example.

Alloying Step

An Na—Si alloy was produced using the porous Si of Example 1 as an Si source and NaH as an Na source. NaH washed with hexane in advance was used as this NaH. NaH and porous Si were weighed to a molar ratio of 1.05:1 and mixed in a cutter mill. The mixture of NaH and porous Si was heated in an Ar atmosphere at 420° C. for 40 hours in a heating furnace to obtain powdered NaSi.

Silicon Clathrate Production Step 1

The silicon clathrate production step by the solid phase method was performed by using the NaSi obtained in the above alloying step as an Na—Si alloy and $AlF_3$ as an Na trapping agent.

The Na—Si alloy and $AlF_3$ were weighed to a molar ratio of 1:0.35 and mixed in a cutter mill to obtain a reaction raw material. The powdered reaction raw material thus obtained was placed in a stainless steel reaction vessel and heated in an Ar atmosphere at 300° C. for 60 hours in a heating furnace to cause a reaction. The product of this reaction is considered to contain NaF and Al that are by-products, in addition to $Na_{20}Si_{136}$ that is a silicon clathrate. This reaction product was washed with a mixed solvent of $HNO_3$ and $H_2O$ with a volume ratio of 90:10. The by-products in the reaction product were thus removed. The washed reaction product was filtered, and the obtained solid content was dried at 120° C. for three hours or more to obtain a powdered product I.

Silicon Clathrate Production Step 2

The silicon clathrate production step by the solid phase method was performed by using the product I as an Na—Si alloy and $ZnCl_2$ as an Na trapping agent. This silicon clathrate production step can be said to be a step of further removing Na from the product I, that is, $Na_{20}Si_{136}$.

The Na—Si alloy and $ZnCl_2$ were weighed to a molar ratio of 1:0.75 and mixed to obtain a powdered reaction raw material. The powdered reaction raw material thus obtained was placed in a stainless steel reaction vessel and heated in an Ar atmosphere at 310° C. for 15 hours in a heating furnace to cause a reaction. The product of this reaction is considered to contain $Na_2ZnCl_4$ and Zn that are by-products, in addition to $Na_0Si_{136}$ that is a silicon clathrate.

This reaction product was washed with a mixed solvent of $HNO_3$ and $H_2O$ with a volume ratio of 90:10. The by-products in the reaction product were thus removed. The washed reaction product was filtered, and the obtained solid content was dried at 120° C. for three hours or more to obtain a powdered product II. This product II is a silicon clathrate negative electrode active material of Example 1.

Example 2

Porous Si Manufacturing Step

Porous Si of Example 2 was manufactured in a manner similar to that of the porous Si manufacturing step of Example 1 except that the heating was performed at 530° C. for 12 hours.

A silicon clathrate negative electrode active material of Example 2 was obtained in a manner similar to that of Example 1 except that the porous Si of Example 2 was used as an Si source, the heating in the alloying step was performed at 400° C. for 46 hours, the heating in the silicon clathrate production step 1 was performed at 270° C. for 80 hours, and the silicon clathrate production step 2 was not performed. The silicon clathrate negative electrode active material of Example 2 is the product I obtained by the silicon clathrate production step 1.

Example 3

A silicon clathrate negative electrode active material of Example 3 was obtained in a manner similar to that of Example 1 except that the porous Si of Example 2 was used as an Si source, the heating in the alloying step was performed at 400° C. for 46 hours, the heating in the silicon clathrate production step 1 was performed at 310° C. for 40 hours, and the silicon clathrate production step 2 was not performed. The silicon clathrate negative electrode active material of Example 3 is the product I obtained by the silicon clathrate production step 1.

Example 4

A silicon clathrate negative electrode active material of Example 4 was obtained in a manner similar to that of Example 1 except that the porous Si of Example 2 was used as an Si source, the heating in the alloying step was performed at 400° C. for 46 hours, the heating in the silicon clathrate production step 1 was performed at 320° C. for 40 hours, and the silicon clathrate production step 2 was not performed. The silicon clathrate negative electrode active material of Example 4 is the product I obtained by the silicon clathrate production step 1.

Example 5

Porous Si Manufacturing Step

Porous Si of Example 5 was manufactured in a manner similar to that of the porous Si manufacturing step of Example 1 except that the heating was performed at 580° C. for 24 hours.

A silicon clathrate negative electrode active material of Example 5 was obtained in a manner similar to that of Example 1 except that the porous Si of Example 5 was used as an Si source, the heating in the alloying step was performed at 400° C. for 46 hours, the heating in the silicon clathrate production step 1 was performed at 360° C. for 20 hours, and the silicon clathrate production step 2 was not performed. The silicon clathrate negative electrode active material of Example 5 is the product I obtained by the silicon clathrate production step 1.

Example 6

A silicon clathrate negative electrode active material of Example 6 was obtained in a manner similar to that of Example 1 except that the porous Si of Example 5 was used as an Si source, the heating in the alloying step was performed at 400° C. for 46 hours, the heating in the silicon clathrate production step 1 was performed at 410° C. for 12 hours, and the silicon clathrate production step 2 was not performed. The silicon clathrate negative electrode active material of Example 6 is the product I obtained by the silicon clathrate production step 1.

Example 7

Porous Si Manufacturing Step

Porous Si of Example 7 was manufactured in a manner similar to that of the porous Si manufacturing step of Example 1 except that the heating was performed at 680° C. for 12 hours.

A silicon clathrate negative electrode active material of Example 7 was obtained in a manner similar to that of Example 1 except that the porous Si of Example 7 was used as an Si source, the heating in the alloying step was performed at 420° C. for 40 hours, the heating in the silicon clathrate production step 1 was performed at 300° C. for 40 hours, and the silicon clathrate production step 2 was not performed. The silicon clathrate negative electrode active material of Example 7 is the product I obtained by the silicon clathrate production step 1.

Example 8

Porous Si Manufacturing Step

Porous Si of Example 8 was manufactured in a manner similar to that of the porous Si manufacturing step of Example 1 except that the heating was performed at 780° C. for 12 hours.

A silicon clathrate negative electrode active material of Example 8 was obtained in a manner similar to that of Example 1 except that the porous Si of Example 8 was used as an Si source, the heating in the alloying step was performed at 420° C. for 40 hours, the heating in the silicon clathrate production step 1 was performed at 300° C. for 60 hours, and the silicon clathrate production step 2 was not performed. The silicon clathrate negative electrode active material of Example 8 is the product I obtained by the silicon clathrate production step 1.

Example 9

Porous Si Manufacturing Step

Si powder and metallic Li were weighed to a molar ratio of 1:4, and mixed in an Ar atmosphere at room temperature for 0.5 hours in a mortar to cause the Si powder and the metallic Li to react to obtain $Li_4Si$. $Li_4Si$ thus obtained was caused to react with ethanol in an Ar atmosphere. The product of this reaction contains Si and $CH_3CH_2OLi$. This reaction product was filtered, and the obtained solid content was dried at 120° C. for three hours or more to obtain powdered porous Si of Example 9.

A silicon clathrate negative electrode active material of Example 9 was obtained in a manner similar to that of Example 1 except that the porous Si of Example 9 was used as an Si source, the heating in the alloying step was performed at 400° C. for three hours, the heating in the silicon clathrate production step 1 was performed at 270° C. for 40 hours, and the silicon clathrate production step 2 was not performed. The silicon clathrate negative electrode active material of Example 9 is the product I obtained by the silicon clathrate production step 1.

Example 10

A silicon clathrate negative electrode active material of Example 10 was obtained in a manner similar to that of Example 1 except that the porous Si of Example 9 was used as an Si source, the heating in the alloying step was performed at 350° C. for three hours, the heating in the silicon clathrate production step 1 was performed at 270° C. for 100 hours, and the silicon clathrate production step 2 was not performed. The silicon clathrate negative electrode active material of Example 10 is the product I obtained by the silicon clathrate production step 1.

Example 11

A silicon clathrate negative electrode active material of Example 11 was obtained in a manner similar to that of Example 1 except that the porous Si of Example 9 was used as an Si source, the heating in the alloying step was performed at 300° C. for three hours, the heating in the silicon clathrate production step 1 was performed at 270° C. for 120 hours, and the silicon clathrate production step 2 was not performed. The silicon clathrate negative electrode active material of Example 11 is the product I obtained by the silicon clathrate production step 1.

Comparative Example

A negative electrode active material of Comparative Example was obtained in a manner similar to that of Example 1 except that Si powder was used as an Si source. The negative electrode active material of Comparative Example is the product II obtained by the silicon clathrate production step 2.

Table 1 below shows Examples 1 to 11 and Comparative Example.

TABLE 1

| | Porous Si Manufacturing Step | | Alloying Step | | Silicon Clathrate Production Step 1 | | Silicon Clathrate Production Step 2 | |
|---|---|---|---|---|---|---|---|---|
| | Temperature (° C.) | Time (h) | Temperature (° C.) | Time (h) | Temperature (° C.) | Time (h) | Temperature (° C.) | Time (h) |
| Example 1 | 580 | 12 | 420 | 40 | 300 | 60 | 310 | 15 |
| Example 2 | 530 | 12 | 400 | 46 | 270 | 80 | N/A | N/A |
| Example 3 | | | | | 310 | 40 | N/A | N/A |
| Example 4 | | | | | 320 | 40 | N/A | N/A |
| Example 5 | 580 | 24 | 400 | 46 | 360 | 20 | N/A | N/A |
| Example 6 | | | | | 410 | 12 | N/A | N/A |
| Example 7 | 680 | 12 | 420 | 40 | 300 | 40 | N/A | N/A |
| Example 8 | 780 | 12 | 420 | 40 | 300 | 60 | N/A | N/A |
| Example 9 | room temperature | 0.5 | 400 | 3 | 270 | 40 | N/A | N/A |
| Example 10 | room temperature | 0.5 | 350 | 3 | 270 | 100 | N/A | N/A |
| Example 11 | room temperature | 0.5 | 300 | 3 | 270 | 120 | N/A | N/A |
| Comparative Example | N/A | N/A | 420 | 40 | 300 | 60 | 310 | 15 |

Evaluation Example 1

X-ray diffraction measurements were carried out for the negative electrode active materials of Examples 1 to 6, Examples 9 to 11, and Comparative Example with a powder X-ray diffractometer.

Figure 2:
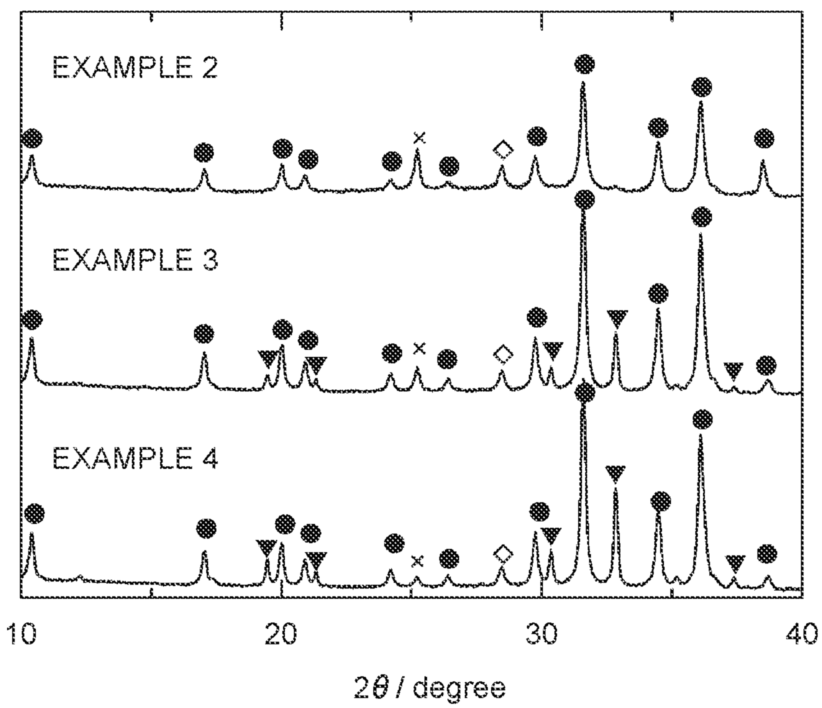
FIG. 2 is an overlay X-ray diffraction chart of negative electrode active materials of Examples 2 to 4.
Figure 3:
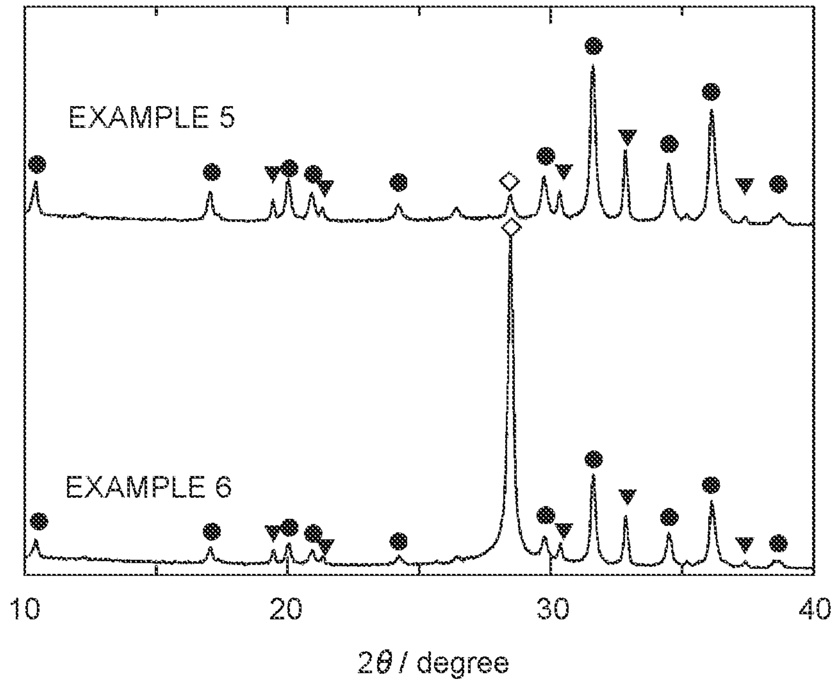
FIG. 3 is an overlay X-ray diffraction chart of negative electrode active materials of Examples 5 and 6.
Figure 4:
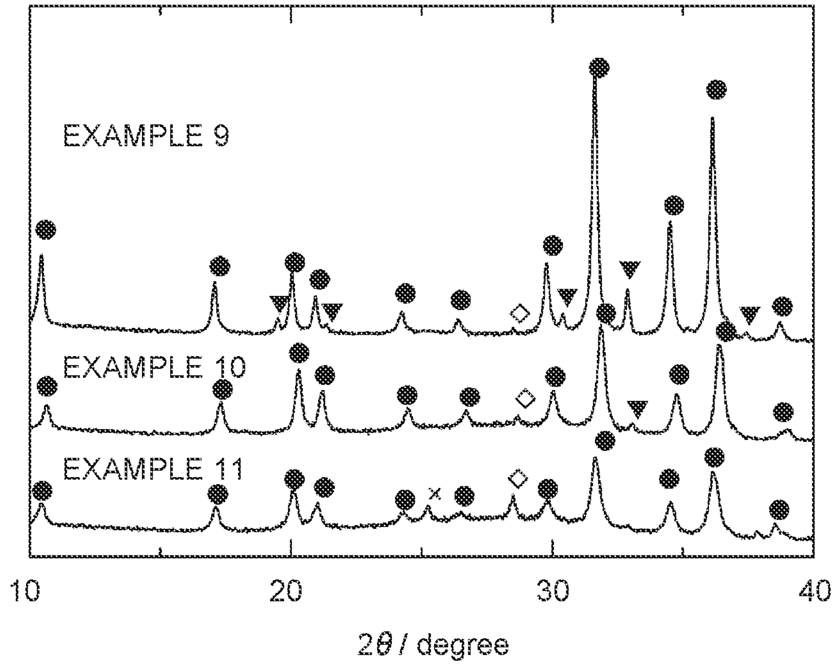
FIG. 4 is an overlay X-ray diffraction chart of negative electrode active materials of Examples 9 to 11.

FIG. 1 is an overlay X-ray diffraction chart of the negative electrode active materials of Example 1 and Comparative Example. FIG. 2 is an overlay X-ray diffraction chart of the negative electrode active materials of Examples 2 to 4. FIG. 3 is an overlay X-ray diffraction chart of the negative electrode active materials of Examples 5 to 6. FIG. 4 is an overlay X-ray diffraction chart of the negative electrode active materials of Examples 9 to 11. In FIGS. 1 to 4, the peaks shown by black circles are derived from a type-II silicon clathrate, the peaks shown by black triangles are derived from a type-I silicon clathrate, the peaks shown by white diamonds are derived from Si crystals having a diamond structure, and the peaks shown by the symbol "x" are derived from $AlF_3$.

It can be seen from FIGS. 1 to 4 that each of the negative electrode active materials of Examples 1 to 6, Examples 9 to 11, and Comparative Example mainly contains a type-II silicon clathrate. These results demonstrate that the silicon clathrate production step by the solid phase method using an Na trapping agent was effective as a step of producing a type-II silicon clathrate. As shown in FIG. 2, the higher the heating temperature in the silicon clathrate production step, the higher the peaks derived from a type-I silicon clathrate. In some embodiments, it can therefore be said that, in order to reduce production of the type-I silicon clathrate and further increase the content of the type-II silicon clathrate, the heating in the silicon clathrate production step is performed at a low temperature, suitably at less than 310° C., or 300° C. or less.

As shown in FIG. 3, the negative electrode active material of Example 6 for which the heating temperature in the silicon clathrate production step is higher than 400° C. has a higher peak derived from Si crystals. In some embodiments, it can therefore be said that, in order to reduce formation of Si crystals and further increase the content of the type-II silicon clathrate, the heating in the silicon clathrate production step is performed at a low temperature, suitably at 400° C. or less.

As shown in FIG. 4, the higher the heating temperature in the alloying step, the higher the peaks derived from the type-I silicon clathrate. In some embodiments, it can therefore be said that, in order to reduce production of the type-I silicon clathrate and further increase the content of the type-II silicon clathrate, the heating in the alloying step is performed at a low temperature, suitably at 450° C. or less, less than 400° C., 380° C. or less, or 360° C. or less.

As shown in FIG. 4, the negative electrode active material of Example 11 for which the heating in the alloying step was performed at a low temperature has a peak derived from $AlF_3$ that is an Na trapping agent. The above results show that, in order to cause the reaction for producing a silicon clathrate from an Na—Si alloy to proceed effectively, it is effective to perform the heating in the alloying step at a somewhat high temperature. Specifically, it can be said that the heating temperature in the alloying step is suitably 300° C. or more, 310° C. or more, 320° C. or more, or 340° C. or more.

Evaluation Example 2

The cumulative pore volume and the BET specific surface area were measured for the porous Si of Examples 1 to 6, the Si powder used in the alloying step of Comparative Example, the negative electrode active materials of Examples 1 to 6, and the negative electrode active material of Comparative Example by using a nitrogen gas adsorption method.

Figure 5:
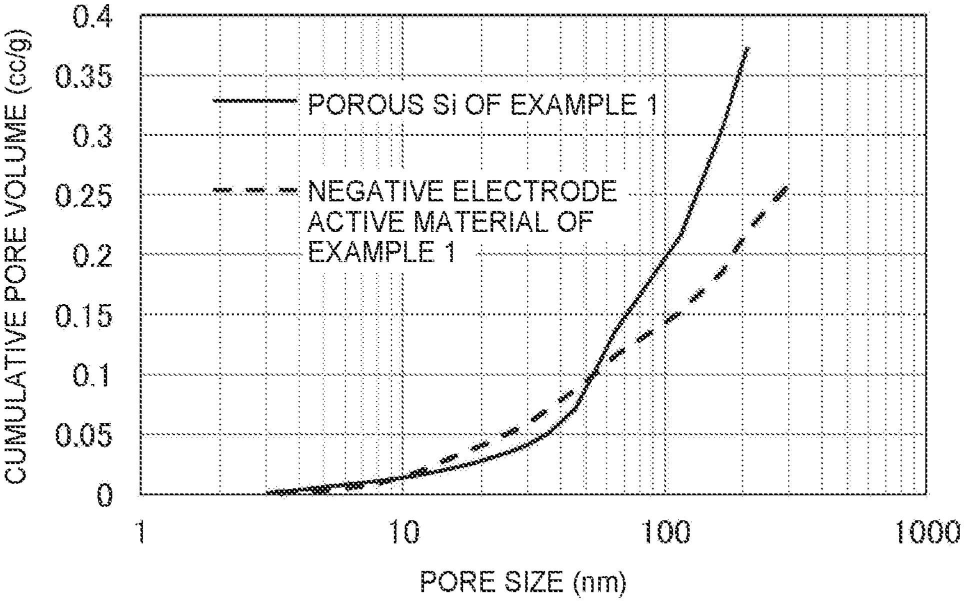
FIG. 5 is a graph showing the cumulative pore volumes of porous Si of Example 1 and the negative electrode active material of Example 1.
Figure 6:
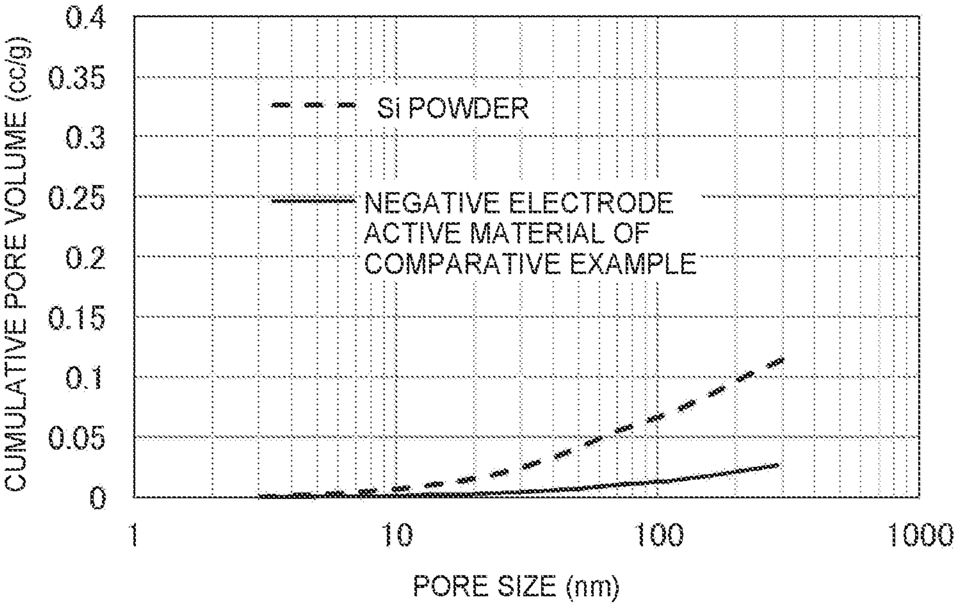
FIG. 6 is a graph showing the cumulative pore volumes of Si powder used in an alloying step of Comparative Example and the negative electrode active material of Comparative Example.
Figure 7:
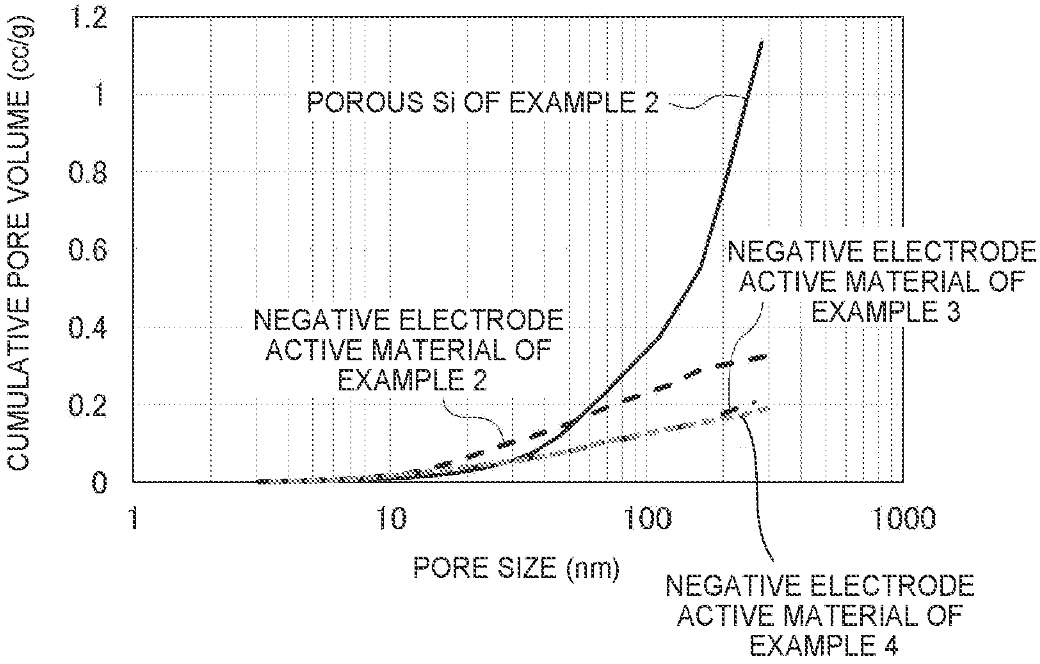
FIG. 7 is a graph showing the cumulative pore volumes of porous Si of Example 2 and the negative electrode active materials of Examples 2 to 4.
Figure 8:
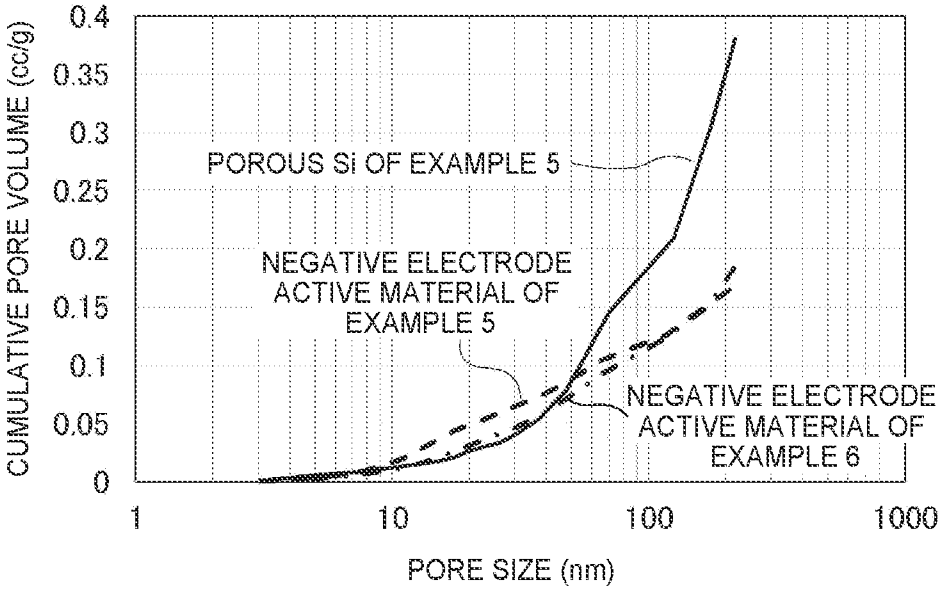
FIG. 8 is a graph showing the cumulative pore volumes of porous Si of Example 5 and the negative electrode active materials of Examples 5 and 6.

FIG. 5 is a graph showing the cumulative pore volumes of the porous Si of Example 1 and the negative electrode active material of Example 1. FIG. 6 is a graph showing the cumulative pore volumes of the Si powder used in the alloying step of Comparative Example and the negative electrode active material of Comparative Example. FIG. 7 is a graph showing the cumulative pore volumes of the porous Si of Example 2 and the negative electrode active materials of Examples 2 to 4. FIG. 8 is a graph showing the cumulative pore volumes of the porous Si of Example 5 and the negative electrode active materials of Examples 5 and 6.

As shown in FIG. 6, the Si powder has a cumulative pore volume of 100 nm or less of about 0.07 $cm^3/g$, and the negative electrode active material of Comparative Example has a cumulative pore volume of 100 nm or less of about 0.01 $cm^3/g$.

On the other hand, as shown in FIG. 5, the porous Si of Example 1 has a cumulative pore volume of 100 nm or less of about 0.2 $cm^3/g$, and the negative electrode active material of Example 1 has a cumulative pore volume of 100 nm or less of about 0.14 $cm^3/g$.

These results show that a negative electrode active material having a large cumulative pore volume of 100 nm or less, that is, a negative electrode active material having a sufficient pore volume, can be obtained by using porous Si as an Si source.

As shown in FIG. 8, the porous Si of Example 5 has a cumulative pore volume of 100 nm or less of about 0.18 $cm^3/g$, the negative electrode active material of Example 5 has a cumulative pore volume of 100 nm or less of 0.12 $cm^3/g$, and the negative electrode active material of Example 6 has a cumulative pore volume of 100 nm or less of about 0.11 $cm^3/g$.

These results also show that, even when the silicon clathrate production step is performed in one step, a negative electrode active material having a large cumulative pore volume of 100 nm or less, that is, a negative electrode active material having a sufficient pore volume, can be obtained by using porous Si as an Si source.

The cumulative pore volume of 100 nm or less of the negative electrode active material of Example 2 is larger than the cumulative pore volumes of 100 nm or less of the negative electrode active materials of Examples 3 and 4. In some embodiments, this result shows that, in order to manufacture a negative electrode active material having a large pore volume, the heating in the silicon clathrate production step is performed at a low temperature, particularly suitably at 300° C. or less.

As shown in FIG. 7, the porous Si of Example 2 has a cumulative pore volume of 100 nm or less of about 0.34 $cm^3/g$, the negative electrode active material of Example 2 has a cumulative pore volume of 100 nm or less of about 0.23 $cm^3/g$, the negative electrode active material of Example 3 has a cumulative pore volume of 100 nm or less of about 0.13 $cm^3/g$, and the negative electrode active material of Example 4 has a cumulative pore volume of 100 nm or less of about 0.13 $cm^3/g$.

The results of FIGS. 5 to 8 show that a negative electrode active material having a cumulative pore volume of 100 nm or less of 0.1 $cm^3/g$ or more, namely having a sufficient pore volume, can be obtained by using porous Si as an Si source. The results of FIGS. 5 to 8 also show that it is useful to use porous Si having a cumulative pore volume of 100 nm or less of 0.1 $cm^3/g$ or more, 0.15 $cm^3/g$ or more, or 0.18 $cm^3/g$ or more, and it is particularly suitable to use porous Si having a cumulative pore volume of 100 nm or less of 0.2 $cm^3/g$ or more, 0.25 $cm^3/g$ or more, or 0.3 $cm^3/g$ or more.

Evaluation Example 3

The BET specific surface area and the average particle size $D_{50}$ were measured for the negative electrode active materials of each Example and Comparative Example. The results are shown in Table 2.

TABLE 2

| | Porous Si Manufacturing Step Temperature (° C.) | Alloying Step Temperature (° C.) | Silicon Clathrate Production Step 1 Temperature (° C.) | Silicon Clathrate Production Step 2 Temperature (° C.) | BET Specific Surface Area ($m^2/g$) | Average Particle Size $D_{50}$ (μm) |
|---|---|---|---|---|---|---|
| Example 1 | 580 | 420 | 300 | 310 | 41.7 | 2.9 |
| Example 2 | 530 | 400 | 270 | N/A | 43.7 | 3.2 |
| Example 3 | | | 310 | N/A | 31.6 | 2.7 |
| Example 4 | | | 320 | N/A | 31.9 | 2.9 |
| Example 5 | 580 | 400 | 360 | N/A | 32.6 | 2.0 |
| Example 6 | | | 410 | N/A | 26.5 | 2.9 |
| Example 7 | 680 | 420 | 300 | N/A | 36.0 | 2.8 |
| Example 8 | 780 | 420 | 300 | N/A | 31.8 | 2.6 |
| Example 9 | room temperature | 400 | 270 | N/A | 40.0 | 2.4 |
| Example 10 | room temperature | 350 | 270 | N/A | 50.2 | 2.1 |
| Example 11 | room temperature | 300 | 270 | N/A | 87 | 1.7 |
| Comparative Example | N/A | 420 | 300 | 310 | 16.3 | 9.3 |

As shown in Table 2, the negative electrode active materials of all the Examples have a larger BET specific surface area than the negative electrode active material of Comparative Example. The negative electrode active material of each Example has a sufficiently large average particle size. These results show that a negative electrode active material having a sufficient pore volume can be obtained by using porous Si as an Si source. It can be said that, in order to obtain a negative electrode active material having a larger pore volume, it is suitable to perform the heating in the silicon clathrate production step at as low a temperature as possible, specifically, at less than 400° C., 380° C. or less, 360° C. or less, 300° C. or less, or 290° C. or less.

The BET specific surface area of the porous Si of each Example was 20 $m^2/g$ or more.

What is claimed is:

1. A method for manufacturing a negative electrode active material, the method comprising:

an alloying step of causing an Na source and an Si source to react to produce an Na—Si alloy containing Na and Si, wherein porous Si with a BET specific surface area of 20 $m^2/g$ or more is used as the Si source; and a silicon clathrate production step of heating the Na—Si alloy and reducing an amount of Na in the Na—Si alloy to produce a type-II silicon clathrate, wherein, in the entire silicon clathrate production step, a reaction raw material containing the Na—Si alloy and an Na trapping agent that are in contact with each other is heated, and Na derived from the Na—Si alloy is caused to react with the Na trapping agent to reduce the amount of Na in the Na—Si alloy, wherein a composition of Na and Si in the Na—Si alloy of the raw reaction material is represented by $Na_ySi_{136}$, where 24<y, and wherein the Na trapping agent is selected from $CaCl_2$), $CaBr_2$, $CaI_2$, and $MgCl_2$.

2. The method according to claim 1, wherein the reaction raw material is a mixture of the Na—Si alloy and the Na trapping agent that are both in a powdered state.

3. The method according to claim 1, wherein:

the alloying step is performed at 450° C. or less; and the silicon clathrate production step is performed at 400° C. or less.

4. The method according to claim 1, wherein washing is performed after the silicon clathrate production step.

5. A negative electrode active material formed according to the method of claim 1 and containing a type-II silicon clathrate and having a BET specific surface area of 20 $m^2/g$ or more and an average particle size $D_{50}$ of 0.5 μm or more.

6. The method according to claim 2, wherein:

the alloying step is performed at 450° C. or less; and the silicon clathrate production step is performed at 400° C. or less.

* * * * *